UNITED STATES PATENT OFFICE.

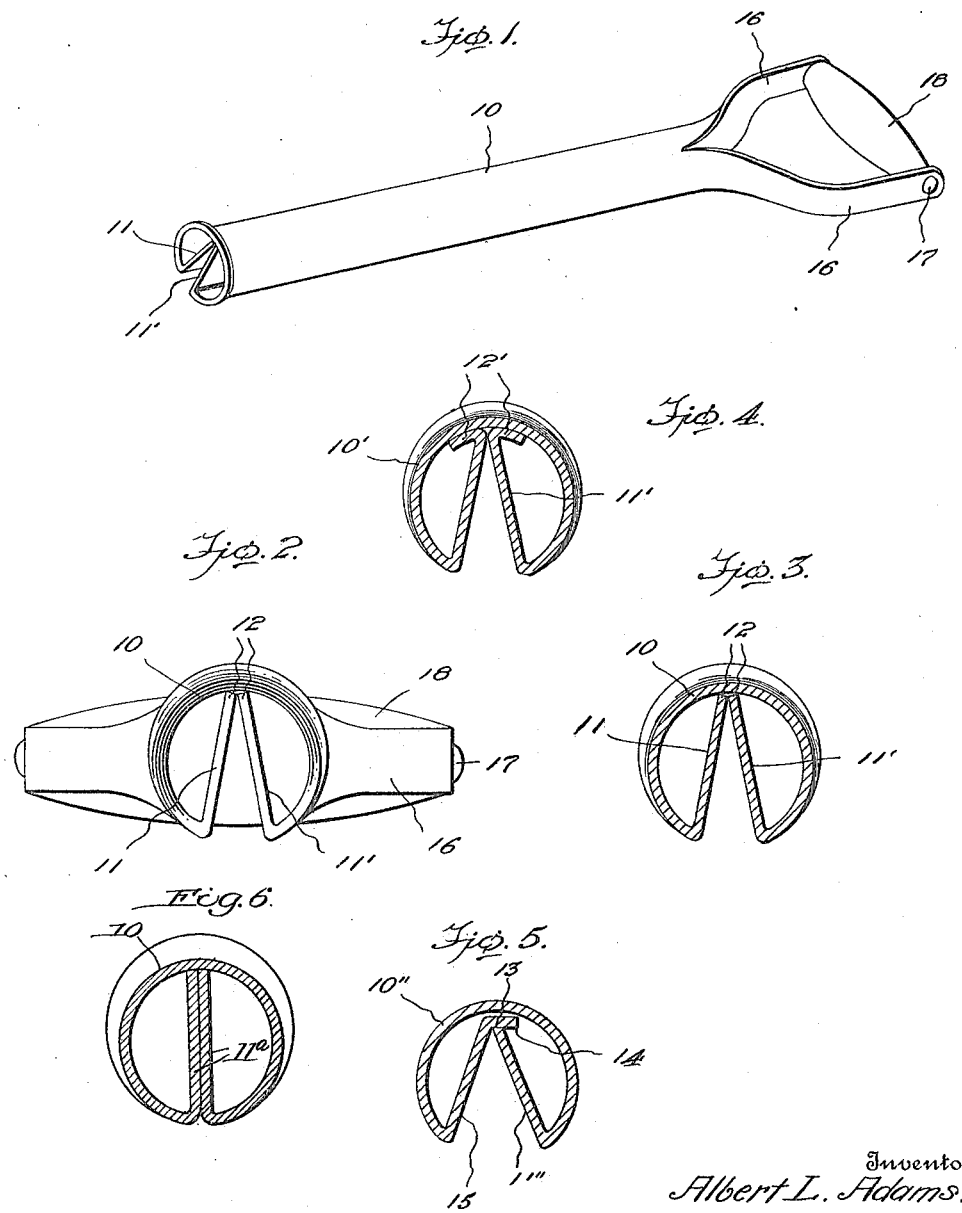

ALBERT L. ADAMS, OF CEDAR RAPIDS, IOWA.

HANDLE.

1,213,136.   Specification of Letters Patent.   Patented Jan. 23, 1917.

Application filed April 3, 1916. Serial No. 88,615.

*To all whom it may concern:*

Be it known that I, ALBERT L. ADAMS, a citizen of the United States, residing at Cedar Rapids, in the county of Linn and State of Iowa, have invented certain new and useful Improvements in Handles, of which the following is a specification, reference being had therein to the accompanying drawing.

This invention relates to improvements in handles, for shovels and the like, one object of the invention being the provision of a handle made of sheet metal bent so as to be reinforced longitudinally of the length thereof and provided at one end with a hand grip receiving portion.

A further object of this invention is the provision of a tubular handle of this character in which the body portion is provided with inturned edges that are incased by the tubular portion and form longitudinal braces or reinforcements throughout the length of the handle, thereby stiffening the same and preventing the same from bending under the usual strain. The present handle is especially designed for use upon scoops, shovels, forks, and other hand tools of this nature that can be readily attached through a ferrule connection by rivets or otherwise.

In the accompanying drawings: Figure 1 is a perspective view of the complete handle. Fig. 2 is an end view taken from the scoop receiving end thereof. Fig. 3 is a cross section through the handle. Figs. 4, 5 and 6 are cross sections through modified forms of said handle.

Referring to the drawings, the numeral 10 designates the handle proper which is made from a single sheet of metal and is in tubular form, the edges 11 being inturned to be incased within the tubular portion and extending longitudinally the full length thereof, the terminal edges 12 thereof being adapted to abut the inner side of the tubular portion. As here illustrated, the edges 11 form a space V-shaped in cross section throughout the length of the handle.

In the form of handle shown in Fig. 4, the tubular body portion 10' is provided with the inturned edges 11' having the oppositely bent and curved terminal portions 12' which abut the inner face of the tubular member and thus more rigidly support the same throughout the length.

In the construction shown in Fig. 5, the handle 10'' is provided with one inturned flange 11'' which seats in the recess 13 formed by the hook-shaped terminal 14 of the opposite inturned reinforcing member 15, as heretofore stated.

In Fig. 6 the two inwardly bent edges 11$^a$ are compressed together to close the V-shaped slot, and thus form a tubular handle with the two edges forming the housed longitudinal reinforcement.

One end of the tubular portion is split, as shown in Fig. 1, to provide the two spaced terminals 16 between which is supported by means of the riveting rod 17 the hand grip 18, and where so desired, the handle may be tubular throughout its length and adapted to receive a hand grip similar to that shown in my United States Patent, Number 1,168,267, granted to me January 18, 1916.

From the foregoing description it is evident that with a metal handle made according to and embodying the present invention, the same will be light, yet strong, and cannot possibly splinter as do the wooden handles, when bent as would a simple tubular handle, inasmuch as the longitudinal reinforcements bear the strain in the lifting when the device is used as a prying member, or as a scoop, shovel or fork.

What I claim is:—

1. A handle made from a single sheet of metal formed in a tube and having the edges thereof inturned and incased within the tube to form a longitudinal reinforcement.

2. A hollow handle, the two longitudinal edges of which are bent inwardly the full length of and housed by the body thereof.

3. A hollow handle, the edges of which are bent inwardly and housed by the body thereof, such edges forming an open longitudinal channel the full length of the handle.

4. A tubular metal handle, the two long edges of which are bent inwardly and inclined to form an inverted V-shaped channel the length of one side of the handle.

5. A handle made from a single sheet of metal formed in a tube and having the edges thereof inturned and incased within the tube to form a longitudinal reinforcement, one end of the said handle being provided with two spaced terminals and a handle grip secured between said terminals.

6. A hollow handle, the edges of which are bent inwardly and housed by the body thereof, one end of the said handle being provided with two spaced terminals and a handle grip secured between said terminals.

7. A hollow handle, the edges of which are bent inwardly and housed by the body thereof, such edges forming an open longitudinal channel the full length of the handle, one end of the said handle being provided with two spaced terminals and a handle grip secured between said terminals.

8. A tubular metal handle, the two long edges of which are bent inwardly and inclined to form an inverted V-shaped channel the length of one side of the handle, one end of the said handle being provided with two spaced terminals and a handle grip secured between said terminals.

In testimony whereof I affix my signature.

ALBERT L. ADAMS.

Copies of this patent may be obtained for five cents each, by addressing the "Commissioner of Patents, Washington, D. C."